C. C. THOMAS.
FLUID METER.
APPLICATION FILED MAY 12, 1911.

1,222,492.

Patented Apr. 10, 1917.
4 SHEETS—SHEET 1.

Fig. 1.

Witnesses:
Geo. Haynes.
D. A. Davies

Inventor:
Carl C. Thomas
By Marble & Matty
Attys

C. C. THOMAS.
FLUID METER.
APPLICATION FILED MAY 12, 1911.

1,222,492.

Patented Apr. 10, 1917.
4 SHEETS—SHEET 3.

Witnesses:
Geo. Haynes
D. H. Davies

Inventor:
Carl C. Thomas
By Marble & Matty
Attys

C. C. THOMAS.
FLUID METER.
APPLICATION FILED MAY 12, 1911.

1,222,492.

Patented Apr. 10, 1917.
4 SHEETS—SHEET 4.

Witnesses:
Geo. Haynes
D. F. Davies

Inventor:
Carl C. Thomas
By Marble & Smith
attys.

UNITED STATES PATENT OFFICE.

CARL CLAPP THOMAS, OF MADISON, WISCONSIN.

FLUID-METER.

1,222,492. Specification of Letters Patent. Patented Apr. 10, 1917.

Application filed May 12, 1911. Serial No. 626,679.

*To all whom it may concern:*

Be it known that I, CARL C. THOMAS, a citizen of the United States of America, and a resident of Madison, in the county of Dane and State of Wisconsin, have invented certain new and useful Improvements in Fluid Meters, of which the following is a specification.

The invention relates to a method of and apparatus for determining the rates of flow of fluids.

It embodies improvements upon the method and apparatus set forth in the patents to Carl C. Thomas No. 946,886, January 18, 1910 and No. 1,043,983, November 12, 1912. The present application is a continuation in part of application Serial No. 489,840, filed April 14, 1909, renewal No. 770,488 May 28, 1913.

The objects of my invention are, to improve present methods of and means for determining the rate of flow of fluids such as steam or other gases and vapors flowing through pipes or conduits, to render such measurement automatic, to provide for the continuous and cumulative measurement of the flow, and to render the apparatus employed simple and reliable.

Other objects and advantages of the invention will hereinafter appear.

According to the method of determining the rate of flow of steam or other gas or vapor, described and claimed in my Patent No. 946,886, above mentioned, the dry gas (the term gas here including dry steam) has heat applied to it and the rise of temperature thereby produced is determined. If the steam or gas or vapor is not already dry, it is heated to dryness before the operation just above described is performed upon it. The specific heat of dry steam and most other dry gases being known, (and if not known, being readily determined) it is relatively easy, from the rise of temperature produced by imparting heat at a known rate to such gas or vapor, to determine, from tables or plotted curves, the rate of flow of such steam or gas. In my application Sr. No. 489,840, above mentioned, I have described and illustrated methods of and means for measuring such rates of flow automatically, according to one of which methods and apparatus, automatic means are provided for maintaining constant the rise of temperature produced in the steam or other gas, independent of variation of rate of flow of such steam or other gas, and for measuring the current required to keep constant such rise of temperature and thereby measuring the rate of flow. Such method of measuring rates of flow is the method herein described and claimed, and the apparatus herein described and claimed constitutes an operative embodiment of apparatus for carrying out such method, diagrammatically illustrated in my said application Sr. No. 489,840, besides embodying numerous important improvements on such prior apparatus.

Referring now to the accompanying drawings.

Figure 1:
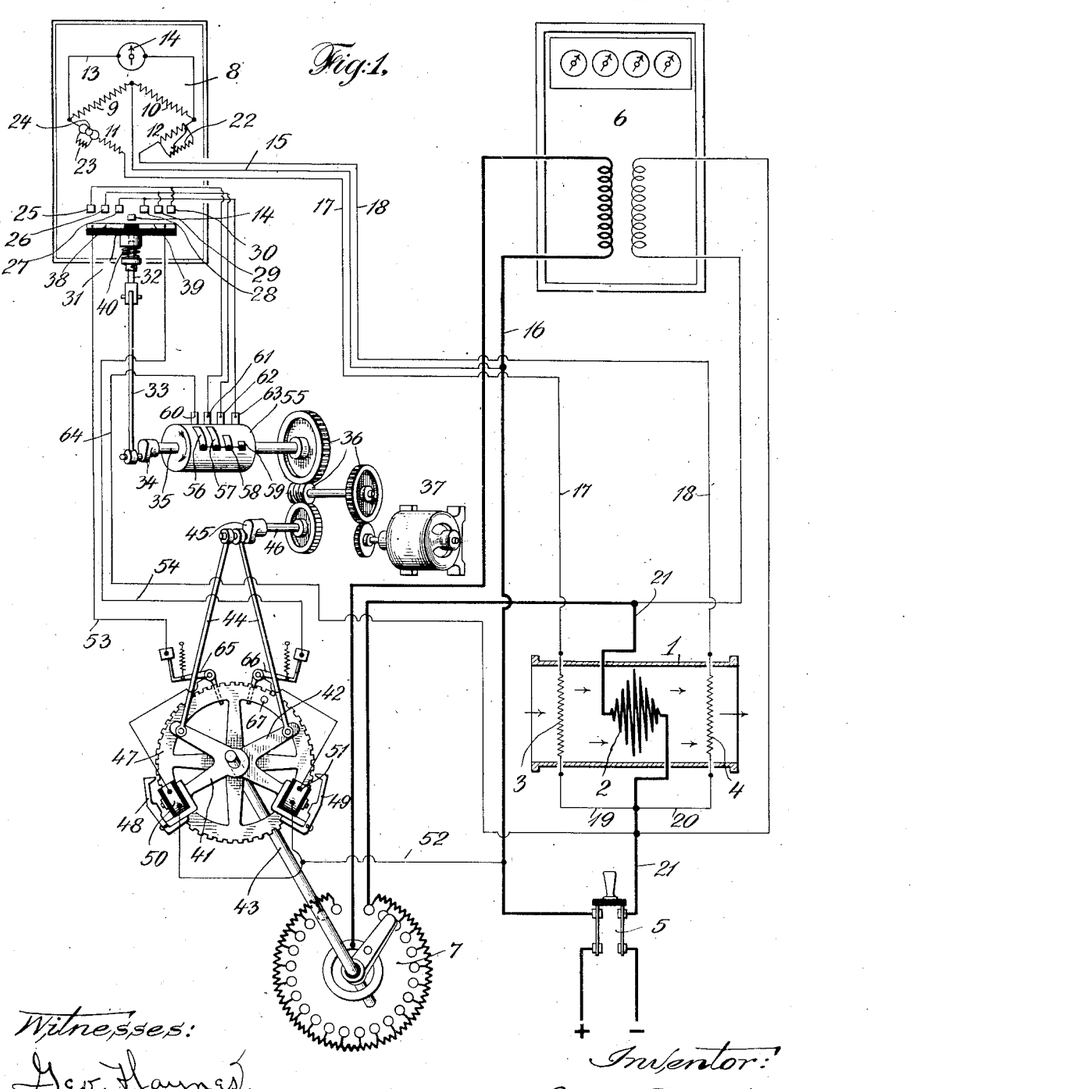
Figure 1 is a diagrammatic elevation of the complete apparatus, including electric connections, parts of the apparatus being moved out of their correct plane, for clearness of illustration.

Referring first to Fig. 1, 1 designates a conduit of my meter through which flows the steam or other gas, the flow of which is to be measured; 2 designates an electric resistance heating coil in said conduit and in the path of the steam or other gas passing therethrough, and 3 and 4 designate the resistance coils of electric thermometers, one located in advance of the said heating coil 2, the other beyond said heating coil 2, and both located in the path of the steam or other gas, the flow of which is to be measured, and so disposed in the path of such steam or gas, as hereinafter described, as to afford an average measurement of the temperature of such steam or other gas throughout substantially the entire cross section of the conduit. 5 designates a switch of ordinary construction controlling the supply of heating current to heating coil 2 of the meter; 6 designates a recording wattmeter for measuring the flow of current through said heating coil, and 7 designates an adjustable rheostat for controlling the flow of such heating current to maintain a predetermined difference between the temperature of the steam or gas on the inlet side of the meter, and the temperature of such steam or gas on the outlet side of the meter. This rheostat is arranged to be operated and adjusted automatically by mechanism comprising an automatic controlling switch 8 which, in the construction shown, includes a Wheatstone bridge and galvanometer, the needle of the galvanometer forming one contact member of the controlling switch. The said automatic controlling mechanism for the rheostat further comprises means for closing contact through the galvanometer needle without interfering materially with freedom of movement of said needle; means for preventing sparking at the contacts of said controlling switch; and power-driven step by step mechanism, controlled by said controlling switch, for moving the contact arm of the rheostat 7, as required to maintain the desired temperature difference in the meter.

In the upper part of the illustration of the controlling switch 8, in Fig. 1, I have illustrated diagrammatically, the conductors of the Wheatstone bridge, comprising resistance branches 9, 10, 11 and 12, and a cross wire 13 containing a galvanometer of which 14 is the needle. In the lower part of the illustration of switch 8, in Fig. 1, needle 14 of the galvanometer is shown in its actual position. A conductor 15 connects resistances 9 and 10 of the Wheatstone bridge, to one current lead 16 of the heating coil 2 of the meter, and other conductors, 17 and 18, connect resistances 11 and 12 respectively of the Wheatstone bridge to the thermometer resistances 3 and 4 respectively, said thermometer resistances being connected by conductors 19 and 20, to the other current lead 21 of the heating coil of the meter. It will be apparent from the connections shown, that when, by the action of the heating coil 2, the temperature of the steam or other gas passing through the conduit 1 is raised, so as to vary the resistance of thermometric coil 4, with reference to the resistance of thermometric coil 3, and thereby vary the resistance on the corresponding side of the Wheatstone bridge, the galvanometer needle will be deflected.

The Wheatstone bridge comprises an adjusting resistance 22 in one side while in its opposite side I provide a resistance 23 adapted to be shunted out by means of an ordinary plug switch 24. This resistance 23 is intended to correspond to the change in resistance of thermometric resistance 4, due to the predetermined increase of temperature produced by the action of the heating coil 2.

In the adjustment of the Wheatstone bridge, the bridge is balanced in the ordinary manner, the plug 24 being first inserted so as to shunt out resistance 23, and adjusting resistance 22 being adjusted until no, or substantially no, current flows through the cross wire 13, indicating that the two sides of the bridge are in balance. The plug 24 is then removed, at once throwing the bridge out of balance, and so deflecting the needle 14; but the balance of the bridge will be restored, and the needle 14 will be brought back to normal position, when, by the action of heating coil 2, the resistance of thermometric resistance 4 has been changed to the degrees corresponding to the predetermined rise in temperature desired to be maintained.

As is well known, thermometric resistances, such as 3 and 4, may be either positive or negative; that is to say, they may be of such material that their resistance will increase with rise of temperature, or they may be of such material that their resistance will decrease with rise of temperature. For certain practical reasons I prefer to employ positive resistances for the thermometric resistances 3 and 4, that is to say, to employ resistance coils of material such that their resistance increases with rise of temperature. Since the direction of flow of the gas through the meter is from left to right as shown in Fig. 1, and therefore, since resistance 4 is to have the higher resistance under normal operation, the compensating resistance 23 of the Wheatstone bridge is in the conductor 17 of thermometric resistance 3. If thermometric coils 3 and 4 were of negative resistance material, the direction of flow of the gas through the meter being still from left to right, the compensating resistance 23 of the Wheatstone bridge would be connected to the leg 12 of the bridge, and adjusting resistance 22 of the bridge would, customarily and conveniently, be connected to leg 11 of the bridge.

On one side of the galvanometer needle 14 contact posts 25, 26 and 27 are provided, and on the opposite side of said needle a corresponding series of contact posts, 28, 29 and 30 is provided. The number of these posts may be less or greater than that shown, as desired. These posts are intended to make contact with the galvanometer needle 14 when such needle is not in central position, and thereby to control step by step mechanism hereinafter described by which the rheostat 7 is adjusted. Since the needle 14 should be free for the greater part of the time at least, and should not be subject to the drag incident to rubbing over contact points, said needle 14 is normally in a plane below that of contact posts 25—30 inclusive, but is adapted to be raised at intervals toward the plane of said posts by a reciprocating member 31 moved up and down by mechanism comprising a plunger 32, a pitman 33, a crank 34 and crank shaft 35, reducing gearing 36 and a motor 37. Reciprocating elevating member 31 is provided on opposite sides of the center with contact bars 38 and 39. It will be seen that if, when elevating member 31 is raised, needle 14 is not in a central position but is beneath one or another of the contact posts posts 25—30 inclusive, said needle will serve to complete a connection between one or the other of bars 38 and 39, and the particular post of series 25—30 which the needle 14 may be opposite at that moment.

A spring 40 is interposed between a shoulder of plunger 32 and member 31, to constitute a yielding cushion permitting member 31 to hold the needle 14 in contact with one or another of the contact posts 25—30 for a definite interval of time.

The step by step mechanism for rotating the contact arm or arms of the rheostat 7, comprises two wrist plates, 41 and 42, loosely mounted upon an axis 43 and arranged to be reciprocated by pitmen 44 and a crank 45 on a shaft 46 driven from the reducing gearing 36 of the motor 37. Said step by step mechanism also comprises a ratchet wheel 47 fast on shaft 43, pawls 48 and 49 carried by wrist plates 41 and 42 respectively, and magnets 50 and 51 controlling said pawls 48 and 49 respectively.

Current is supplied to magnets 50 and 51 by a conductor 52 connected to one of the main current leads. Magnet 50 is further connected by a wire 53 to contact bar 38 of the controlling switch 8, and magnet 51 is similarly connected by a wire 54 to the contact bar 39 of the controlling switch 8. On shaft 35 is mounted a commutator 55 comprising contact segments 56, 57, 58 and 59; and in connection with the said commutator are corresponding brushes 60, 61, 62 and 63, of which brush 60 is connected by a return wire 64, to the other main current lead 21. The brush 61 of commutator segment 57 is connected to the two extreme contact posts, 25 and 30. The brush 62 of commutator segment 58 is connected to the two intermediate contact posts 26 and 29; and the brush 63 of commutator segment 59 is connected to the two inner contact posts 27 and 28. The several contact segments 57, 58 and 59, are all electrically connected to the segment 56.

Segments 57, 58 and 59 are of different lengths, so that when circuit is completed through needle 14 and one or the other of contact posts 25—30 inclusive, and through one or another of segments 57, 58 and 59, to one or another of the magnets 50 and 51, the pawl, 48 or 49, of the magnet so energized will remain in engagement with a tooth of the ratchet wheel 47 through a space corresponding to one, or two, or three, teeth of that ratchet wheel, according as circuit is completed through segment 59, or through segment 58, or through segment 57. In the arrangement shown, segment 57 is of a length corresponding to motion of ratchet wheel 47 through a space of three teeth, segment 58 is of a length corresponding to two teeth, and segment 59 is of a length corresponding to one tooth; though, of course, this relation may be varied.

Motor 37 operates continuously, causing the elevator 31 to reciprocate up and down continuously, but, except as contact is closed between needle 14 and one or another of the contact posts 25—30, no change in the adjustment of the rheostat results.

The operation of this rheostat-adjusting apparatus is as follows:

Supposing that steam or gas has been flowing through the meter conduit 1 at a constant rate, and that the automatic mechanism described has adjusted the resistance of the rheostat to maintain the desired rise of temperature of the steam or gas so flowing through that conduit; and supposing that after a time the rate of flow of the steam or gas decreases—the result of which, of course, is that current flowing through coil 2 at the previously prevailing rate will now raise to a higher temperature than before the steam or gas flowing through conduit 1, and so will raise the temperature of thermometric resistance 4, the resulting change in resistance of resistance 4 will cause needle 14 to move over one or another of the contact post—for example, post 26, and upon the next rise of elevator 31, circuit will be closed through magnet 50 as follows: from current lead 16, through wire 52 and magnet 50, wire 53, contact bar 38, needle 14, contact post 26, commutator brush 62, commutator segment 58, commutator segment 56, brush 60, and wire 64, to current lead 21. This circuit will continue completed for a period corresponding to upward motion of wrist plate 41 through the space of two teeth of ratchet wheel 47, and therefore ratchet wheel 47 will be advanced clock-wise through the space of two teeth, so moving the contact arm of rheostat 7 through a corresponding number of spaces, and increasing the resistance in the circuit of heating coil 2 correspondingly, so decreasing the rate at which heat is supplied to said coil. As soon as the elevator 31 descends the galvanometer needle 14 is once more free to move and if the adjustment of resistance effected by the operation just described is sufficient to prevent more than the desired rise in temperature in the steam or gas passing through the meter, said needle 14 will swing back to its intermediate position; but if such change in resistance is not sufficient for the purpose the needle 14 will remain under one or another of the contact posts 25, 26 and 27, and upon the next rise of elevator 31 said needle 14 will be raised into contact with that contact post under which it is at the moment, and the commutator 55 will again complete circuit through magnet 50, causing the pawl 48 to advance ratchet wheel 47 through an additional space or spaces according to the particular contact post with which the needle is in contact at the moment.

If, on the other hand, the rate of flow of steam or gas through meter conduit 1 increases, the flow of current through coil 2 at the previously prevailing rate will no longer suffice to raise the steam or gas flowing at the new and greater rate to the desired temperature, and therefore the temperature of thermometric resistance 4 will fall, and the resulting change in its resistance will cause needle 14 to move to the right, and upon the next rise of elevator 31 said needle will contact with one or another of the posts 28, or 29, or 30, so that the commutator 55 will then close circuit through magnet 51, and the pawl 49 of that magnet will move ratchet wheel 47 counter-clockwise through one or two or three spaces, according to circumstances, so moving the contact arm or arms of the rheostat accordingly.

It will be seen that the controlling switch formed by the galvanometer needle 14, the elevator 31 with its contact bars 38 and 39, and posts 25—30 inclusive, constitutes a pilot switch for the control of the rheostat adjusting mechanism. The commutator 55 not only serves to limit the duration of circuit closure through one or the other of magnets 50 and 51, to the space of one, two or three teeth of the ratchet wheel 47, according to circumstances, but also serves to prevent sparking at the contact points of the pilot switch by breaking circuit through the pilot switch before such circuit is broken at the contact points of the pilot switch.

In conductors 53 and 54 cutout switches 65 and 66 are provided which are arranged to be actuated by a pin 67 carried by ratchet wheel 47 in such manner that when said ratchet wheel nears one or the other of the limits of its movement, it encounters an arm of the corresponding cutout switch and operates said switch, so preventing the step by step mechanism from rotating said ratchet wheel farther, but not preventing the other pawl mechanism from rotating the ratchet wheel in the opposite direction. These cutout switches, in the simple form illustrated, comprise bell crank contact levers, one arm of the bell crank arranged to be engaged by the pin 67, the other arm to make contact with a stationary contact post.

Figure 2:
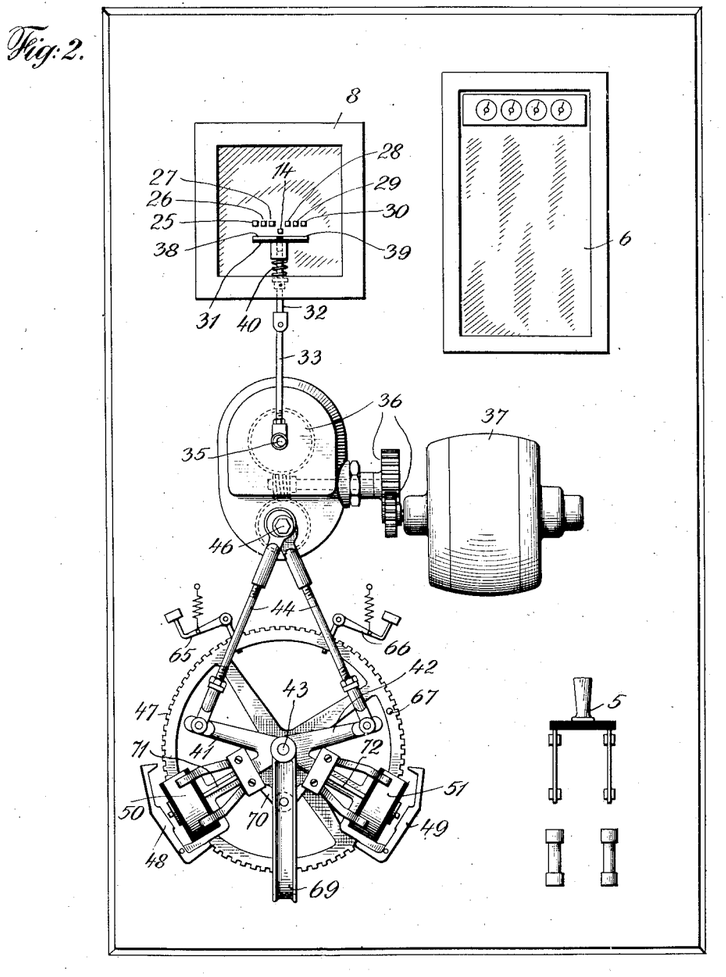
Fig. 2 shows a front elevation of said apparatus.
Figures 3, 4:
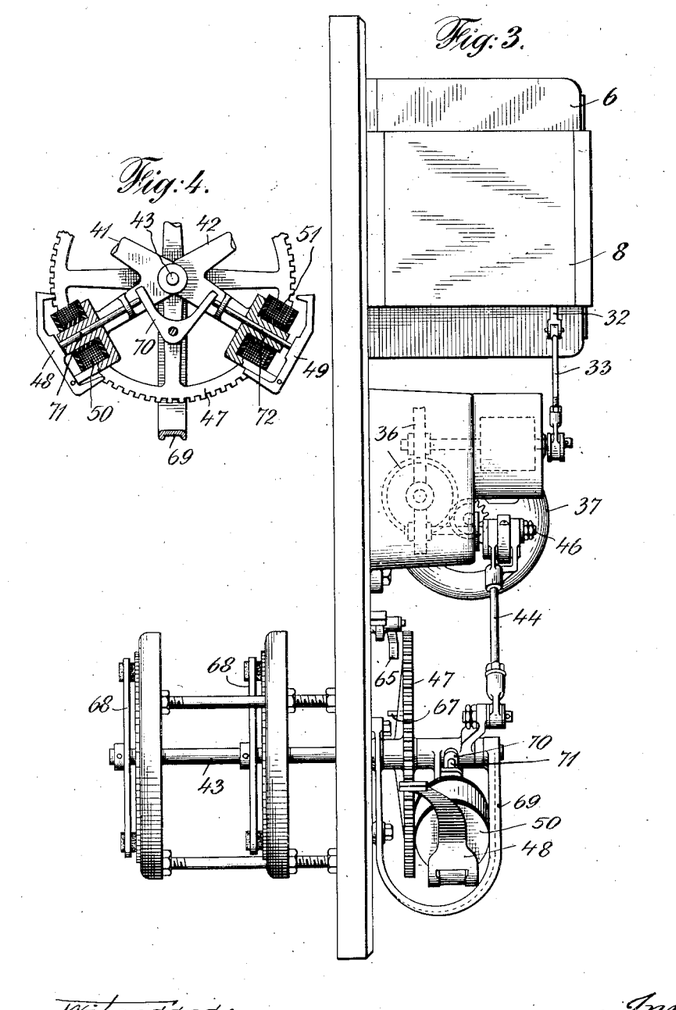
Fig. 3 a side elevation thereof.
Fig. 4 a detail partly sectional view of the step by step automatic adjusting mechanism of said apparatus.

Figs. 2, 3 and 4 illustrate the actual structural arrangement of the parts illustrated diagrammatically in Fig. 1; but the actual structural arrangement corresponds so closely to that illustrated in Fig. 1 that no separate detail description of the parts shown in Figs. 2, 3 and 4, is believed to be necessary. The rheostat 7, as illustrated in Fig. 3, is of well known construction comprising contact arms 68 arranged to be moved by the shaft 43 over a series of contact posts connected to different portions of a resistance conductor as indicated diagrammatically in Fig. 1. An outer bearing is provided for shaft 43 by means of a yoke 69. Upon this same yoke is pivoted a bell crank 70 adapted to engage push pins 71 and 72, passing through the cores of magnets 50 and 51 respectively, and arranged to be actuated by the pawls 48 and 49 of said magnets. The arrangement is such, as will be seen, that when one of said magnets is energized and attracts its pawl, the corresponding push pin is pushed in, thereby, through the bell crank 70, pushing out the opposite push pin and so positively disengaging the other pawl from the ratchet wheel.

Figure 5:
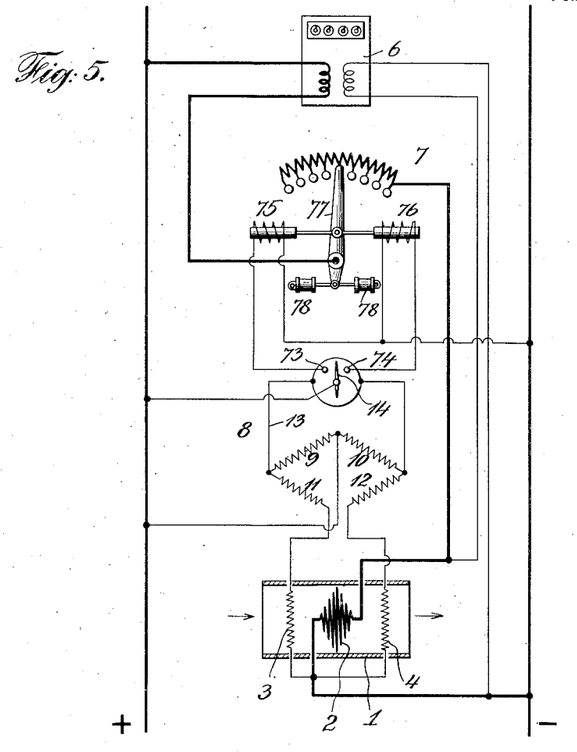
Fig. 5 is a schematic diagram illustrating the broad principle of the meter.

Fig. 5 illustrates diagrammatically the principle of the meter without limitation to any particular type of apparatus for effecting adjustment of the rheostat. In this Fig. 5, as in Fig. 1, 1 designates the conduit of the meter, 2 the heating coil, 3 and 4 the thermometric resistances, 6 a wattmeter and 7 a rheostat in the circuit of the heating coil 2. 8 designates a controlling switch comprising a Wheatstone bridge composed of resistance legs 9, 10, 11 and 12, and a cross wire 13, and 14 designates the needle of a galvanometer in said cross wire. In this construction I have shown the needle as arranged to make direct contact when deflected to one side or the other, with a stationary contact post, 73 or 74, and thereby to close contact through one or the other of two devices, 75 and 76, for shifting the rheostat arm, which devices 75 and 76 are indicated diagrammatically as solenoid motors, the plungers of which are connected to the movable arm 77 of the rheostat 7. In this form of apparatus, when the galvanometer needle is deflected to one side or the other into contact with one or the other of the posts 73 or 74, the corresponding solenoid motor remains energized until, by restoration of normal conditions, the galvanometer needle breaks the circuit of the solenoid previously energized. 78, 78 designate dash pot devices for insuring a dead beat movement of the contact arm 77.

The Wheatstone bridge will have the customary balancing adjustments which it is not thought necessary to illustrate in Fig. 5, and may have the compensating coil 23 and switch 24 illustrated in Fig. 1.

Figure 6:
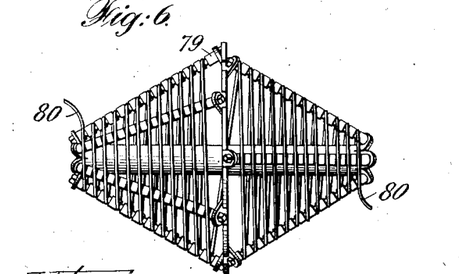
Fig. 6 is an elevation of one form of electric heating resistance and mounting therefor, which may be employed in the meter.

In Fig. 6 I illustrate a heating coil structure which is preferred, comprising a double pyramidal frame 79, upon which is wound a heating conductor 80. A heating coil so mounted influences all portions of the gas current passing through the meter with substantial uniformity.

Figure 7:
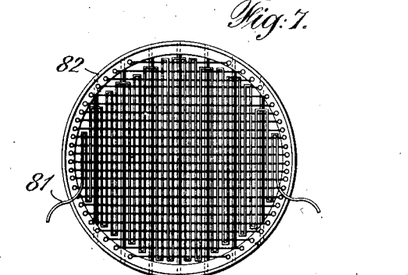
Fig. 7 is an elevation of one arrangement of variable-resistance or thermometric resistance which may be employed in the meter, said arrangement comprising a grid upon which is mounted the variable-resistance conductor.

Fig. 7 indicates the arrangement of thermometric resistances 3 and 4 preferred, the said resistance, 81, being mounted upon a grid 82 adapted to be inserted within the tubular conduit 1 of the meter. Thermometer resistances so mounted are subjected to the influence of all portions of a gas current passing through the conduit of a meter, and give the average temperature of the cross section of the gas current passing through the meter. Thermometer resistances so mounted within the meter are claimed in my application Sr. No. 525,680, above mentioned.

In general, I prefer to have the wattmeters of my apparatus graduated to show directly the flow of gas, rather than to show the flow of current. This is easy since the two are proportional.

It will be noted that the accuracy of my meter is not affected by changes in pressure of the gas or air, since the unit of measurement is that of weight rather than of volume; that is, the meter takes cognizance of the specific gravity of the gas. Also variation of temperature of the incoming gas does not affect the accuracy of the meter because it is a difference of temperature, rather than a fixed temperature, upon which the measurement depends. The meter can therefore be used for gas, air or steam, at either high or low pressure, and at either high or low temperature.

The meter is especially well adapted for measuring the discharge of gas or air from compressors, blowers, etc., because the small and rapid periodic fluctuations of pressure, due to either suction or discharge conditions, do not interfere with the steady action of the thermometers. The time lag of the thermometers is sufficient to smooth out the curve of watts input or of temperature variation, as the case may be, and true average results are thus indicated. The fact that the meter is capable of accurately measuring gas under varying pressures and temperatures, makes it especially valuable for measuring natural gas, as well as compressed air.

The electric energy required to operate the meter is approximately one kilowatt per seventy-five thousand cubic feet of gas per hour at atmospheric pressure. In case the flow of wet gas, or wet steam, is to be measured, such gas or steam must first be dried or superheated as described in my prior patent and pending applications above mentioned. For this purpose I prefer to use the steam and gas drier illustrated and described in my application for Letters Patent filed December 27, 1910, Sr. No. 599,456, in which apparatus as much of the contained moisture as possible is thrown out mechanically and the remainder is evaporated by heat derived from some external source, as for example, steam passing through heating pipes of the apparatus.

In my application Sr. No. 489,840, above mentioned, I have shown diagrammatically, but have not claimed, automatic means for measuring rates of flow, wherein, instead of automatically maintaining a practically constant temperature difference, between the incoming and the outgoing gas, and measuring the flow of heating current required to maintain such constant temperature difference, as in the apparatus above described, a constant flow of heating current is maintained through the heating coil of the meter, and the varying temperature difference between the incoming and outgoing gas is measured and from such difference the varying rate of flow is obtained. Claims for that method of and apparatus for determining rates of flow, are reserved for a separate application; but certain of the claims herein contained are intended to be generic to the method and apparatus herein described, and to the said alternative method and apparatus.

While in the above description I have assumed that but one galvanometer needle is employed, both for use as the movable member 14 of the pilot switch and for indicating the balance, or lack of balance, of the Wheatstone bridge, it will be obvious that two separate galvanometer needles may be employed, one for coaction with the contact posts of the pilot switch, the other for indicating visually current conditions in the cross wire of the bridge.

What I claim is:—

1. The method of determining the rate of flow of fluids, which consists in imparting heat to a moving current of the fluid to thereby raise the temperature of said fluid, automatically regulating the imparting of said heat so as to keep constant one of the two factors, namely, the rate at which heat is imparted or the temperature rise produced, and determining the other of said factors.

2. The method of determining the rate of flow of fluids, which consists in passing a moving current of the fluid into heating proximity to electric resistance means, passing electric current through said resistance means and thereby heating the fluid, automatically regulating the flow of said heating current so as to keep constant one of the two factors, namely, rate at which heat is imparted or the temperature rise produced, and determining the other of said factors.

3. The herein described method of determining the rate of flow of fluids, which consists in imparting heat to a moving current of the fluid, automatically regulating the rate at which said heat is imparted so as to maintain a constant temperature rise independent of varying rates of flow of said fluid, and determining the heat so imparted.

4. The herein described method of determining the rate of flow of fluids, which consists in passing a moving current of said fluid into heating proximity to electric resistance means, passing electric current through said resistance means and thereby heating the fluid, automatically regulating the flow of said heating current so as to maintain a constant temperature rise independent of varying rates of flow of said fluid, and determining the heat so imparted.

5. Apparatus such as described comprising in combination a conduit, heating means therein, temperature responsive means on opposite sides of said heating means, means controlled by said temperature responsive means for regulating automatically the amount of heat dissipated in said conduit to maintain constant the temperature rise produced and means for measuring the heat imparted.

6. Apparatus such as described comprising in combination a conduit, electric resistance means therein, temperature responsive means upon opposite sides of said resistance means, means controlled by said temperature responsive means for regulating automatically the current flowing through said resistance to keep constant the temperature rise produced and means for measuring the rate at which heat is imparted.

7. Apparatus such as described, comprising in combination a conduit, heating means therein, temperature responsive means on opposite sides of said heating means, automatic heat-controlling means controlled by said temperature-responsive means and arranged to maintain a constant temperature rise, and means for measuring the heat imparted to maintain said temperature rise.

8. Apparatus such as described, comprising in combination a conduit, electric resistance means therein, temperature responsive means on opposite sides of said electric resistance means, automatic controlling means arranged to control the flow of current through said electric resistance means and automatically controlled by said temperature-responsive means to maintain a constant temperature rise in the fluid, and means for measuring the flow of current through said resistance means.

9. Apparatus such as described, comprising in combination a conduit, electric resistance means therein, temperature responsive means on opposite sides of said electric resistance means, a rheostat in circuit with said resistance means, and automatic rheostat-adjusting means controlled by said temperature-responsive means, and means for measuring the flow of current through said resistance means.

10. Apparatus such as described, comprising in combination a conduit, electric resistance means therein, temperature responsive means on opposite sides of said electric resistance means, a rheostat in circuit with said resistance means, an automatic power operated rheostat adjusting means controlled by said temperature-responsive means, and means for measuring the flow of current through said resistance means.

11. Apparatus such as described, comprising in combination a conduit, electric resistance means therein, temperature responsive means on opposite sides of said electric resistance means, automatic controlling means arranged to control the flow of current through said electric resistance means and comprising a pilot switch electrically controlled by said temperature responsive means, and means controlled by said pilot switch for regulating the flow of current through said electric resistance means, and means for measuring the flow of current through said resistance means.

12. Apparatus such as described, comprising in combination a conduit, electric resistance means therein, temperature responsive means on opposite sides of said electric resistance means, controlling means arranged to control the flow of current through said electric resistance means, and automatic means for adjusting said controlling means comprising a Wheatstone bridge the relative resistances of opposite sides of which are controlled by said temperature responsive means, and a pilot switch controlled by said Wheatstone bridge and controlling said controlling means, and means for measuring the flow of current through said resistance means.

13. Apparatus such as described, comprising in combination a conduit, electric heating means therein, electric resistances, on opposite sides of said heating means which vary their resistances with varying temperatures, automatic controlling means arranged to control the flow of current through said heating resistance means and comprising a Wheatstone bridge to opposite sides of which said variable resistances are connected, and a pilot switch operated by said Wheatstone bridge and controlling said controlling means, and means for measuring the flow of current through said heating resistance means.

14. Apparatus such as described, comprising in combination, a conduit, electric resistance means therein, temperature responsive means on opposite sides of said electric resistance means, controlling means arranged to control the flow of current through said electric resistance means, automatic adjusting mechanism for said controlling means comprising a pilot switch including a normally free movable member controlled by said temperature responsive means and a plurality of contact points with which such movable member may contact, said movable member being normally out of the plane of said contact points, and means for moving said movable member at intervals into the plane of said contact points, and means controlled by said pilot switch for adjusting said controlling means, and means for measuring the flow of current through said electric resistance means.

15. Apparatus such as described, comprising in combination a conduit, electric resistance means therein, temperature responsive means on opposite sides of said electric resistance means, controlling means arranged to control the flow of current through said electric resistance means, automatic adjusting mechanism for said controlling means comprising a pilot switch including a normally free movable member controlled by said temperature responsive means and a plurality of contact points with which said movable member may contact, said movable member being normally out of the plane of said contact points and means for moving such movable member at intervals into the plane of said contact points, and step by step mechanism controlled by said pilot switch for adjusting said controlling means, and means for measuring the flow of current through said electric resistance means.

16. Apparatus such as described, comprising in combination a conduit, electric resistance means therein, temperature means on opposite sides of said electric resistance means, a rheostat arranged to control the flow of current through said electric resistance means, means for adjusting said rheostat comprising a ratchet wheel reciprocating means including pawls arranged to engage said ratchet wheel, one pawl to move said wheel in one direction, another to move same in the opposite direction, and means controlling the engagement of one pawl or the other with said ratchet wheel controlled by said temperature responsive means, and means for measuring the flow of current through said electric resistance means.

17. Apparatus such as described, comprising in combination a conduit, electric resistance means therein, temperature-responsive means on opposite sides of said electric resistance means, a rheostat arranged to control the flow of current through said electric resistance means, means for adjusting said rheostat comprising a ratchet wheel reciprocating means including pawls arranged to engage said ratchet wheel, one pawl to move said wheel in one direction, another to move the same in the opposite direction, means controlling the engagement of one pawl or the other with said ratchet wheel controlled by said temperature responsive means, and positive disengaging means interposed between said pawls to be operated thereby and arranged to positively move one pawl out of engaging position when the other pawl is moved into engagement with said ratchet wheel, and means for measuring the flow of current through said electric resistance means.

18. Apparatus such as described, comprising in combination a conduit, electric resistance means therein, temperature responsive means on opposite sides of said electric resistance means, automatic controlling means arranged to control the flow of current through said electric resistance means, said controlling means including a pilot switch electrically controlled by said temperature responsive means, means controlled by said pilot switch for regulating the flow of current through said electric resistance means, and means for breaking the circuit through said pilot switch prior to the breaking of said circuit by the pilot switch.

19. Apparatus such as described, comprising in combination a conduit, electric resistance means therein, temperature responsive means on opposite sides of said electric resistance means, controlling means arranged to control the flow of current through said electric resistance means, automatic adjusting mechanism for said controlling means comprising a pilot switch and means operated by said pilot switch for adjusting said controlling means comprising ratchet mechanism including reciprocating means and driving means therefor and contact mechanism operated by said driving means and arranged to break circuit through the pilot switch prior to the breaking of such circuit by the pilot switch, and means for measuring the flow of current through said electric resistance.

20. Apparatus such as described, comprising in combination a conduit, electric resistance means therein, temperature responsive means on opposite sides of said electric resistance means, controlling means arranged to control the flow of current through said electric resistance means, automatic adjusting mechanism for said controlling means comprising a pilot switch including a normally free movable member controlled by said temperature responsive means and a plurality of contact points with which said movable member may contact, said movable member being normally out of the plane of said contact points, and means for moving said movable member at intervals into the plane of said contact points, means operated by said pilot switch for adjusting said controlling means comprising ratchet mechanism including reciprocating means and driving means therefor and contact mechanism operated by said driving means and arranged to break circuit through the pilot switch prior to the breaking of such circuit by the pilot switch and elevating means operated by said driving means for moving the movable member of said pilot switch into the plane of said contact points, and means for measuring the flow of current through said electric resistance.

21. Apparatus such as described, comprising in combination a conduit, electric heating means therein comprising a frame structure having the form of two tapering bodies arranged base to base and a resistance conductor wound thereon, and temperature responsive means on opposite sides of said electric resistance means, and means for determining the flow of current through said heating means.

22. Apparatus such as described, comprising in combination a conduit, electric heating means therein comprising a frame structure of double-pyramidal form having a resistance conductor wound thereon, and temperature responsive means on opposite sides of said electric heating means, and means for determining the flow of current through said electric heating means.

23. Apparatus such as described, comprising in combination a conduit, heating means therein, temperature-responsive means on opposite sides of said heating means, controlling means arranged to control the action of said heating means, automatic means for adjusting said controlling means comprising a Wheatstone bridge, the relative resistances of opposite sides of which are controlled by said temperature responsive means, one of the sides of said Wheatstone bridge including a switching device and a resistance adapted to be shunted thereby, said resistance corresponding to a temperature difference to be maintained by said heating means, and means controlled by said Wheatstone bridge and controlling said controlling means, and means for measuring the heat imparted by said heating means.

24. The method of measuring the rate of flow of fluids which comprises imparting heat to a flowing current of the fluid to produce a constant rise in temperature of said current, and measuring the rate at which said heat is so imparted to produce said rise in temperature.

25. The method of measuring the rate of flow of fluids which comprises imparting heat to a flowing current of the fluid to produce a constant rise in temperature of said current, and measuring the rate at which heat is so imparted to produce said rise in temperature.

26. A meter for fluids having means for imparting heat to a flowing current of the fluid, means responsive to the rise in temperature produced in the fluid by heat imparted thereto, and means for automatically controlling the rate at which heat is so imparted, to maintain a constant rise of temperature in the fluid, said last means being regulated by said first means.

27. A meter for fluids having means for imparting heat to a flowing current of the fluid, means responsive to the rise in temperature produced in the fluid by heat imparted thereto, and means controlled by said temperature responsive means for regulating the supply of heat to maintain a predetermined rise in temperature in the fluid.

28. A meter for fluids having means for imparting heat to a flowing current of the fluid, means for determining the rise in temperature produced in the fluid by heat imparted thereto, and automatic controlling means operated by variation in rise of temperature produced in the fluid by the action of said means for imparting heat for regulating the supply of heat and arranged to maintain a predetermined rise in temperature in the fluid.

29. A meter for fluids having electrical heating means for imparting heat to a flowing current of fluid, means for controlling the flow of electric current through said heating means, means for determining the rise in temperature of the fluid arranged to control said controlling means, and means for measuring the electrical energy imparted to said heating means.

30. A meter for fluids having electrical heating means for imparting heat to a flowing current of fluid, means responsive to the temperature rise of the fluid, means regulated by said temperature responsive means for automatically controlling the supply of electrical energy to said heating means, and means for measuring the electrical energy so supplied to the heating means.

31. The method of measuring the rate of flow of a fluid which consists in regulating automatically through variations in temperature the introduction of heat into said fluid from some heating means to maintain substantially constant one of two factors, heat transfer or temperature change in one of the elements affected by the heat transfer, and determining the effect of the heat transfer on one of said elements affected thereby.

32. The method of measuring the rate of flow of a fluid which consists in regulating the introduction of heat into said fluid from some heating means to maintain substantially constant one of two factors, heat transfer or temperature change in one of the elements affected by the heat transfer, and determining the effect of the heat transfer on said fluid.

33. In combination, a source of heat, means for regulating the transfer of heat therefrom to a moving current of fluid whereby both said source and said fluid are affected by the transfer of heat and means for determining the effect of said heat transfer on one of the elements affected thereby, said last means coöperating with said first means to provide a basis for measuring the rate of flow of said fluid.

34. In combination, an electric heater for imparting heat to a moving current of fluid, a resistance in circuit with said heater, means for determining the effect of the heat transfer on the fluid, and means controlled by said first means for varying said resistance automatically.

35. The method of measuring the rate of flow of a fluid which consists in introducing heat into a current of fluid, automatically maintaining substantially constant the heating effect on said fluid, and determining some of the factors of which said heating effect is a function.

36. The method of measuring the flow of fluids which consists in passing a stream of said fluid into proximity to a body or medium having a different temperature than said fluid, automatically regulating the heat exchange between the fluid and the body or medium to maintain constant one of two factors, namely, rate of heat transfer or temperature difference produced and determining the other of said factors.

In testimony whereof I have signed this specification in the presence of two subscribing witnesses.

CARL CLAPP THOMAS.

Witnesses:
 OSCAR A. KELLER,
 MONTGOMERY R. FENNO.